US012210370B2

(12) United States Patent
Christlbauer

(10) Patent No.: US 12,210,370 B2
(45) Date of Patent: Jan. 28, 2025

(54) OPERATING LEVER COMPRISING LINK SYSTEM

(71) Applicant: elobau Gmbh & Co. KG, Leutkirch (DE)

(72) Inventor: Richard Christlbauer, Legau (DE)

(73) Assignee: elobau GmbH & Co. KG, Leutkirch (DE)

(*) Notice: Subject to any disclaimer, the term of this patent is extended or adjusted under 35 U.S.C. 154(b) by 0 days.

(21) Appl. No.: 17/777,145

(22) PCT Filed: Sep. 3, 2021

(86) PCT No.: PCT/EP2021/074407
§ 371 (c)(1),
(2) Date: Sep. 12, 2022

(87) PCT Pub. No.: WO2022/053411
PCT Pub. Date: Mar. 17, 2022

(65) Prior Publication Data

US 2024/0281017 A1 Aug. 22, 2024

(30) Foreign Application Priority Data

Sep. 14, 2020 (DE) ........................ 102020123843.6

(51) Int. Cl.
*G05G 9/00* (2006.01)
*G05G 5/03* (2008.04)
*G05G 5/05* (2006.01)

(52) U.S. Cl.
CPC ................ *G05G 9/00* (2013.01); *G05G 5/03* (2013.01); *G05G 5/05* (2013.01)

(58) Field of Classification Search
CPC ............... G05G 9/00; G05G 5/03; G05G 5/05
See application file for complete search history.

(56) References Cited

U.S. PATENT DOCUMENTS 1,914,506 A 6/1933 House
3,827,313 A 8/1974 Kiessling
(Continued)

FOREIGN PATENT DOCUMENTS

DE 69411551 T2 3/1999
DE 102006056862 A1 6/2008
(Continued)

OTHER PUBLICATIONS

International Search Report and Written Opinion with English translation mailed Jan. 5, 2022 for International Application No. PCT/EP2021/074407, 14 pages.

*Primary Examiner* — Victor L MacArthur
(74) *Attorney, Agent, or Firm* — Dickinson Wright PLLC

(57) ABSTRACT

An operating lever (1) comprising corresponding a link system (2) is provided. The link system (2) has at least a first link part (3) and restoring means (5), which act on the at least one link part (3) and transfer the latter into a zero position. The operating lever (1) is guided in the link system (2), and the first link part (3) is movably mounted in such a way that a positional change of the operating level (1) to the link system (2) results in a movement of the at least one link part (3) in the direction of the restoring means (5) acting on the at least one link part (3).

15 Claims, 3 Drawing Sheets

(56) References Cited

U.S. PATENT DOCUMENTS

| | | | | | |
|---|---|---|---|---|---|
| 4,081,643 | A * | 3/1978 | Kuo | H01H 21/22 200/559 |
| 4,086,823 | A | 5/1978 | Fatur | |
| 4,095,070 | A * | 6/1978 | Simpson | H01H 13/60 200/525 |
| 4,160,138 | A * | 7/1979 | Brown | H01H 21/50 200/437 |
| 5,537,892 | A | 7/1996 | Wiechman | |
| 5,988,013 | A | 11/1999 | Carr, Jr. et al. | |
| 8,186,239 | B2 | 5/2012 | Wakitani et al. | |
| 10,345,848 | B2 * | 7/2019 | Schaub | G05G 9/047 |
| 2006/0117891 | A1 | 6/2006 | Ichiki et al. | |
| 2010/0242656 | A1 * | 9/2010 | Kino | F16H 59/10 74/473.12 |
| 2023/0350449 | A1 * | 11/2023 | Reisch | G05G 5/05 |

FOREIGN PATENT DOCUMENTS

| | | | |
|---|---|---|---|
| JP | 2019139689 | A | 8/2019 |
| KR | 1020060063729 | A | 6/2006 |

* cited by examiner

OPERATING LEVER COMPRISING LINK SYSTEM

CROSS-REFERENCE TO RELATED APPLICATIONS

This U.S. national phase patent application claims priority to and the benefit of International Patent Application No. PCT/EP2021/074407, filed on Sep. 3, 2021, which claims priority to and the benefit of German patent application no. 10 2020 123 843.6, filed Sep. 14, 2020, the contents of which are incorporated herein by reference in their entirety.

BACKGROUND

1. Technical Field

The present invention relates to an operating lever comprising link system for a pivoting and/or pressure actuation of the operating lever.

2. Related Art

Operating levers of operating devices are often used with a link, in which the operating lever is guided and by means of which a restoring force is exerted on the operating lever, depending on the deflection thereof, in the case of a more specific design. In the case of an operating lever, which is pivotable about two axes, it is common thereby to form the link as a ball cup or in a ball cup-like manner, while in the case of an operating lever, which is only pivotable about one axis, a link is often designed in a circular segmental or in a parabolic manner. It is a disadvantage of designs of this type that due to the rigid link, the operating levers have to be mounted so as to be capable of being displaced in the direction radially to the pivoting movement, or have to have a flexible section, usually mounted by means of a spring, so that a restoring force can be generated. Wear and tear of the plunger or of the link are also likely. Such operating levers thus often have play or a dead zone, in which a movement of the operating lever is possible without a perceivable restoring force.

Systems are known from the prior art, in the case of which the operating lever is a simple, partially rigid element. An operating lever is thus known from KR 10-2006-0063729 A, on the end of which, which faces away from a grip element, a fork is arranged, which is mounted rotatably thereto and which is rotatably mounted in a spring on the end facing away from the lever, wherein the spring has a winding part, from which two spring arms protrude, which are spaced apart from one another and which are arranged in parallel in the rest state, which enclose the one end of the fork between them, wherein said end of the fork has a guide part, which spreads apart the spring arms in response to a movement of the operating lever.

A foot pedal is known from U.S. Pat. No. 4,086,823 A, which is operatively connected to a transmission control unit via a first connection, wherein the transmission control unit has a lever pair, the levers of which are arranged like scissors and which are in each case connected to one another on one end via a spring, wherein a movement of the first connection results via the component part and in a movement of the lever pair.

A restoring device for operating elements is known from U.S. Pat. No. 8,186,239 B2, having a cylindrical base body comprising four similar scissor arms, which are arranged uniformly to one another and which are pivotably mounted on the base body, wherein restoring means bring the scissor arms into a rest position and thus counteract a deflection of the operating element, which is guided between the scissor arms in the base body.

A rotatable operating element is known from JP 2019-139689 A comprising a link consisting of two half rings, restoring springs and actuators, wherein the restoring springs act on the actuators, and wherein the actuators scan the undulated outer side of the half rings. A linearly movable part is provided for this purpose, by means of which the link pars or half rings, respectively, can be moved apart.

A joystick is known from DE 10 2006 056 862 A1, the lever of which is guided in a link, and which, in a zero position, defines a Z direction, in which it can be pushed. The link is guided in the Z direction in a purely linear movement by means of a pivoting movement of the lever, a restoring element in the form of springs is provided.

U.S. Pat. No. 3,827,313 A discloses a pivotable lever, the housing-side end of which is mounted in a two-part link. A deflection of the lever pushes one link half in the Z direction away from the end, wherein the link halves are restored in the direction of their zero position by means of springs.

SUMMARY

The present invention is thus based on the object of solving the problems of the prior art and to propose a link system, which has restoring means and a link, which provides for a use of a rigid operating lever without separate restoring means.

This object is solved by means of an operating lever comprising corresponding link system, wherein the link system has at least a first link part and restoring means, which act on the at least one link part and transfer the latter into a zero position, and wherein the operating lever is guided in the link system, characterized in that the first link part is movably mounted in such a way that a positional change of the operating level to the link system results in a movement of the at least one link part in the direction of the restoring means acting on the at least one link part, wherein the link system has at least a first link part and a second link part, which are movably mounted in such a way that a positional change of the operating lever to the link system results in the two link parts being moved apart perpendicular to the pivoting plane.

The at least two link parts form a link for the operating lever, which is guided in said link, wherein the link in each case exerts a restoring force on the operating lever, which is changed depending on the position thereof. For the generation of the restoring force, the invention has restoring means, which act on the at least two link parts, which have a correspondingly formed link track, so that the operating lever can be a simple, inherently rigid lever. A zero position of the operating lever, in which the operating lever is guided back provided that the latter is not deflected by a user, is defined by means of the restoring forces via the at least two link parts and the link track thereof. According to the invention, the positional change thereby detects a pushing movement in the direction radially to the pivoting movement of the operating lever, as well as the pivoting movement thereof about at least one pivot axis. In the alternative or in addition, it also detects a displacement of the lever similarly as in the case of a commercially available manual motor vehicle transmission or a pulling movement in the direction radially to the pivoting movement of the operating lever. In addition to the reference system of link parts, which are based on one another and which cooperate, and operating lever, a housing receiving both is also conceivable as reference system. The link system of at least two link parts, which are in particular movably mounted in such a way that a positional change of the operating lever to the link system results in the two link parts being moved apart, is in particular suitable for operating levers, which can be pivoted about one axis, but, according to the invention, is also suitable for an operating lever, which can be pivoted about two axes, with corresponding design of the link. To change the restoring force acting on the operating lever, the at least two link parts are formed so as to be capable of being moved relative to one another, in particular so that the restoring force reaches its maximum value in a maximally deflected position of the operating lever, preferably also so that said operating lever still experiences a restoring force in its zero position. According to the invention, the restoring means can thereby act on only one link part, while the other link part is immovable, or can act on both link parts, in particular to the same extent, so that they can be uniformly deflected from their common rest position. In addition to the formation of the link parts so as to be movable relative to one another, they are formed in such a way that an increasing positional change of the operating lever effects the link parts to be moved apart to an increasingly stronger extent and thus effects an increased restoring force on the operating lever.

In further development of the invention it is proposed that the link system has exactly two link parts.

In design of the invention it is proposed that the link parts have recesses, which, together, form a link or, in other words, a link track, in which the operating lever is guided. According to the invention, the recesses are grooves, which are molded into the link parts. This represents a particularly simple design of the link parts. The operating lever thereby particularly preferably has a lug or shaped piece on the end, which is guided in the link, which is in particular formed of a wear-resistant material.

In further development of the invention it is proposed that the width of the link or link track, respectively, is designed to decrease in the pivoting direction of the operating lever with increasing distance from the zero position thereof. This effects the link parts to be pushed apart, wherein the end of the operating lever, which is guided in the link, pushes the link parts farther apart, the more the position of the operating lever deviates from the zero position thereof. In other words, the link track width becomes increasingly narrower in the direction of a maximum pivoting position of the operating lever, so that the increasing deflection of the operating lever also increases the restoring force on the operating lever. This design of the link—and of the link track-effects a line of force, which rises with the deflection of the operating lever, wherein, according to the invention, the line of force can have a linear, exponential, gradual, or any other form on the basis of the design of the link.

In further development of the invention it is provided that the link has detent points and/or positive pressure points. They are in accordance with the invention, in particular for the pushing as well as the pivoting movement of the operating lever, by means of which, in addition to the zero position, further local rest positions or those positions are provided, by means of which a user experiences an increased resistance to the further deflection of the operating lever at certain deflections in response to operating the operating lever.

In design of the invention it is proposed that the link width in the region of the zero position of the operating lever in the direction thereof radially to the pivoting movement is designed so as to decrease in the case of increasing distance therefrom, in particular in such a way that a pushing of the operating lever in the direction radially to the pivoting movement results in the two link parts being moved apart in the direction radially to the pivoting movement. As described above, this leads to a rising restoring force in the case of increasing positional change radially to the pivoting movement, generated by means of the link parts being pushed apart farther against a force. Here, the line of force generated in this way is also determined by the design of the shape of the link. In addition, the link angle, thus the angle of the link track, can be designed to be flatter in response to increasing deflection of the operating lever, so that the force required for the deflection of the operating lever remains constant, and the rising restoring force of the restoring means is compensated.

In further development of the invention it is proposed that the two link parts are deflected relative to one another perpendicular to the movement plane of the operating lever. The movement plane is to be understood as plane, which is spanned by the operating lever in two different pivoting positions, or in one pivoting position and the zero position. The definition of the line of force of the restoring force acting on the operating lever via the link parts is thus made via the design of the link formed by the link parts and the design of the restoring means. If the restoring means moreover generate a constant force in response to arbitrary deflection, the line of force is defined and determined exclusively by means of the design of the link.

In further development of the invention, guide means are proposed, which limit the movement of the link parts in particular to only one, particularly preferably to only one common axis. By means of the limitation of the movability of the link parts, more complicated arrangements are avoided, and the respective restoring force on the operating lever is clearly defined, complex force curves are avoided. According to the invention, the pushing function can moreover be blocked by means of the guide means in the deflected state of the operating lever. The guide means can thereby be stops, rails, grooves, or the like.

In design of the invention it is proposed that the link parts are movably mounted on one another, in particular in such a way that the guide means are arranged on at least one link part, wherein a guide means is arranged on the respective other link part, in particular correspondingly thereto. This is a particularly simple design, by means of which the possibility of movement of the link parts, which is in particular limited to a common axis, is realized by means of as little effort as possible.

In further development of the invention it is proposed that the guide means are formed as protrusions, in particular in elongated, cylindrical form, and hollow spaces corresponding thereto. In addition to the previously mentioned advantage, this design has the advantage that it is particularly space-saving, and the space provided by means of the physical design of the link parts is utilized for the guide means. This also takes into account larger moving apart of the link parts relative to one another because longer guide means are required for this, which guide the link parts in any possible position. According to the invention, the protrusions are thereby rigidly connected to the respective link part or are molded thereon, while the hollow spaces are particularly advantageously molded into the link parts.

In design of the invention it is proposed that the restoring means are formed as hydraulic and/or elastic means, in particular as springs. These are particularly simple and cost-efficient designs of the restoring means and thus reduce the effort as a whole in the production of the operating lever according to the invention comprising link system. In particular hydraulic pistons are in accordance with the invention as hydraulic means, in particular springs or rubber-elastic elements as elastic means.

Due to the particular design of the link system and the corresponding operating lever, which is guided therein, it is advantageously attained by means of the present invention that a particularly compact construction of an operating module having the operating lever and the link system is made possible. An economy of scale of approximately 20% compared to known operating modules can thus be attained. By means of the self-centering, the link system moreover provides for a safe, mechanical operation of the operating lever, so that a particularly fail-safe system is made available. Due to the self-centering, larger tolerances are also possible because the self-centering already compensates for possible errors. For the further optimization of the system according to the invention, a sealed housing is in accordance with the invention, which surrounds the link system and at least partially the operating lever. This improves the possible applications and reliability of the invention yet again, and secures the interior space against external influences. The invention is particularly advantageous for this purpose because the entire system, including housing, can be capable of being inserted into one another, and other connections, such as screws or adhesive, are not required. This is made possible in particular by means of the joined link system. An assembly is thus simplified significantly and a more cost-efficient production is made possible. It is likewise in accordance with the invention to equip the operating lever with magnets, so that a positional change of the operating lever can be determined precisely by means of stationary Hall sensors. As a whole, it is moreover attained by means of the invention that pivoting as well as pushing functions of an operating lever are compatible with a common link system by means of the three-dimensional link.

BRIEF DESCRIPTION OF THE DRAWINGS

The invention will be described in an exemplary manner in a preferred embodiment with reference to a drawing, whereby further advantageous details can be gathered from the figures of the drawing. Functionally identical parts are thereby provided with the same reference numerals.

The figures of the drawing show in detail.

DETAILED DESCRIPTION OF EXAMPLE EMBODIMENTS

Figure 1:
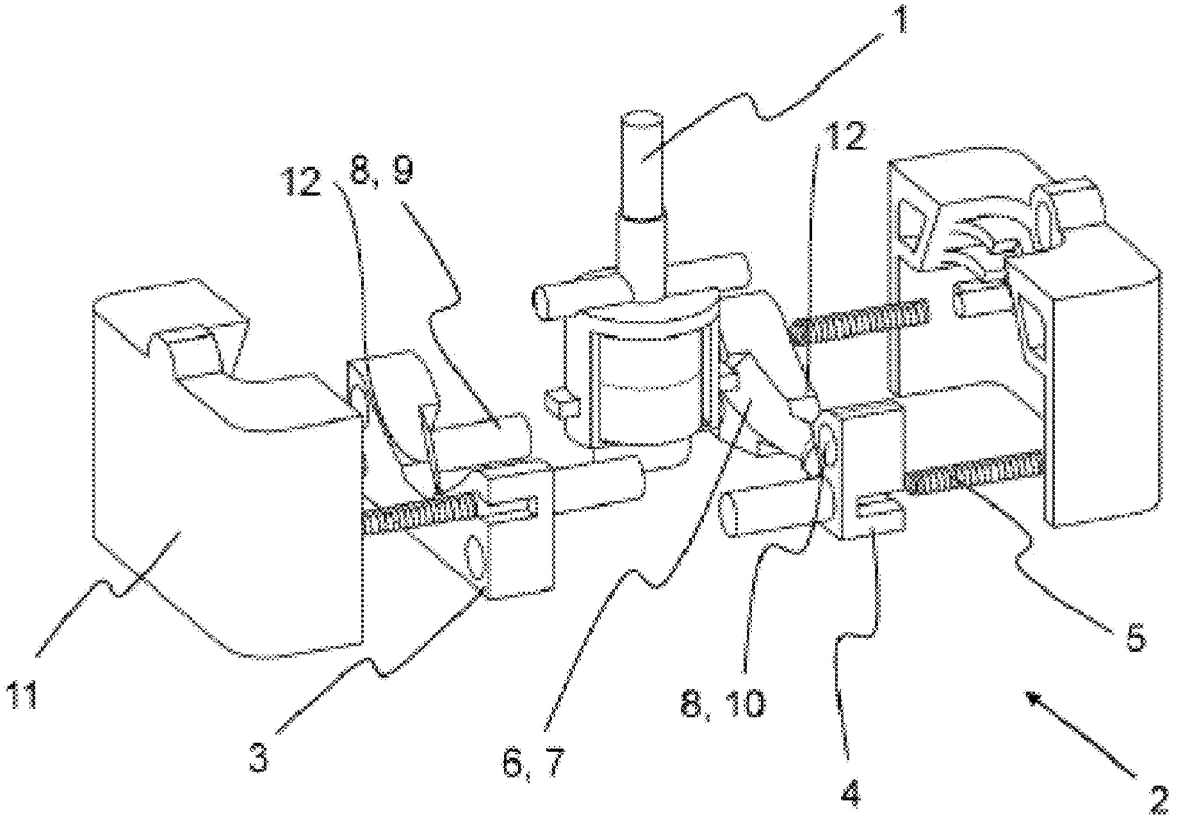
FIG. 1: a schematic exploded view of an operating lever according to the invention comprising link system in a preferred embodiment, wherein the operating lever is located in a zero position

FIG. 1 shows a schematic exploded view of an operating lever 1 according to the invention which is part of a link system 2 in a preferred embodiment, wherein the operating lever 1 is located in a zero position. The operating lever 1 is a simple, inherently rigid operating lever 1, which, in the shown embodiment, is pivotably mounted about a single pivot axis and moreover so as to be capable of being pushed in its direction radially to the pivoting movement. The link system 2 has two link parts 3, 4, which are movably mounted to one another. They are mounted so as to be guided through the housing 11 surrounding the entire link system 2, so that the link parts 3, 4 are movably mounted only on one axis and are positionally changeable to the housing 11. Guide means 8 are moreover provided, which are formed here as protrusions 9 and hollow spaces 10 corresponding thereto, whereby the link parts 3, 4 are moreover movably mounted to a limited extent on a common axis. The guide means 8 are thereby arranged exclusively on the link parts 3, 4, wherein the protrusions 9 are molded to the latter, and the hollow spaces 10 are molded into the link parts 3, 4. The link parts 3, 4 in each case have a recess 6, which is formed as groove, and, together with the recess 6 of the respective other link part 3, 4, define a link 7, which can also be referred to as link track. A free end of the operating lever 1 is guided in this link 7. Restoring means 5, which are formed as springs here, are provided in the link parts 3, 4. The restoring means 5 act on the link parts 3, 4 and move them towards one another, whereby they act on the operating lever 1, in turn. The link 7 is designed in such a way that the width thereof decreases starting at the region of the zero position of the operating lever 1 in the pivoting direction of the operating lever 1 with larger distance from the region of the zero position. In the region of the zero position of the operating lever 1, the width of the link moreover decreases in the direction thereof radially to the pivoting movement with increasing distance therefrom. It is attained thereby that a pivoting deflection as well as a pushing of the operating lever 1 radially to the pivoting movement leads to the link parts 3, 4 being pushed apart, whereby the restoring force, which is generated by means of the restoring means 5, on the link parts 3, 4 and via this on the operating lever 1 increases. According some embodiments the link 7 has detent points 13 and/or positive pressure points 12. The detent points 13 and/or positive pressure points 12 are provided for the pushing as well as the pivoting movement of the operating lever 1, by means of which, in addition to the zero position, further local rest positions or those positions are provided, by means of which a user experiences an increased resistance to the further deflection of the operating lever 1 at certain deflections in response to operating the operating lever 1.

Figure 2:
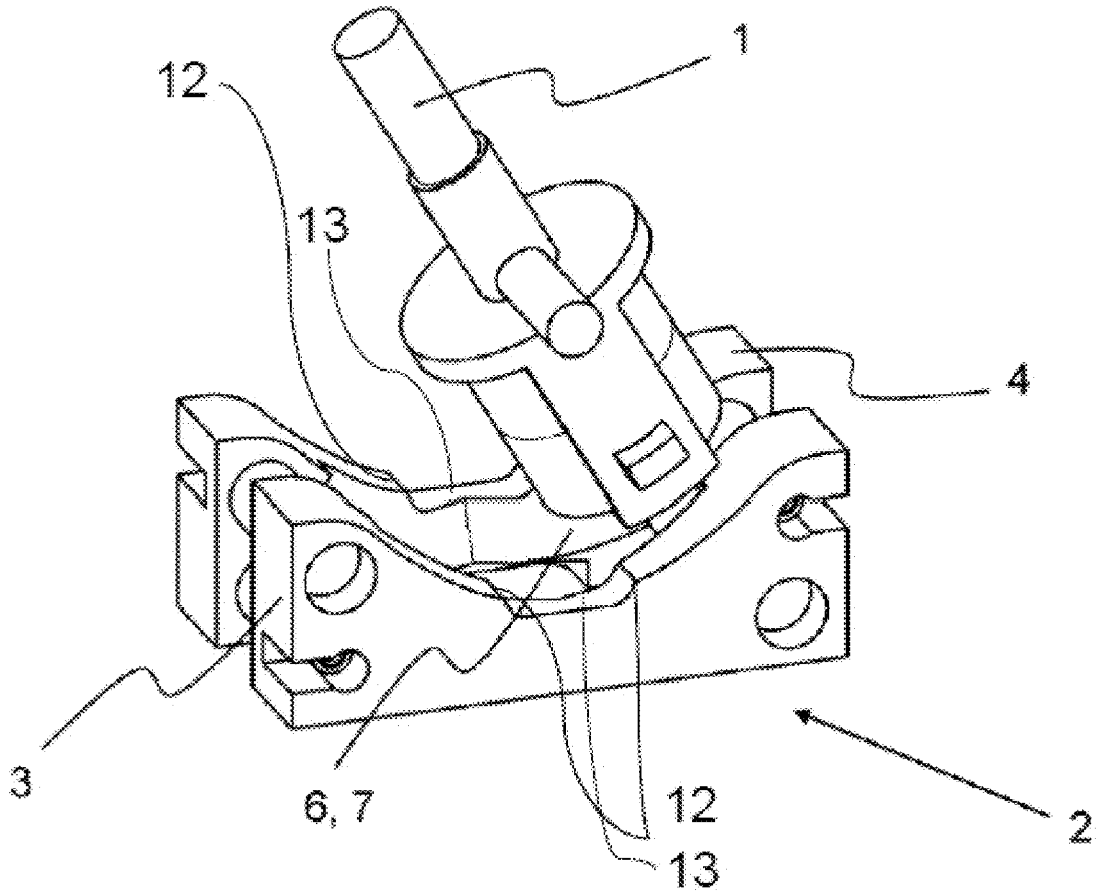
FIG. 2: a schematic side view of an operating lever according to the invention comprising link system in a preferred embodiment, wherein the operating lever is located in a deflected position

FIG. 2 shows a schematic side view of an operating lever 1 according to the invention comprising link system 2 in a preferred embodiment, as illustrated in FIG. 1, wherein the operating lever 1 is located in a deflected position. By means of the deflection of the operating lever 1 and the free end of the operating lever 1 guided in the link 7 formed by means of the recesses 6 of the link parts 3, 4, the link parts 3, 4 are pushed apart, because the free end of the operating lever 1 displaces the link parts 3, 4 on the basis of the link 7, which becomes narrower to the outside in the pivoting direction starting at the zero position, and the link parts 3, 4 are movably mounted to a limited extent on only one common axis. In this position, the restoring force on the operating lever 1 is larger than in response to a smaller deflection of the operating lever 1 on the basis of the design of the link 7, which becomes narrower to the outside.

Figure 3:
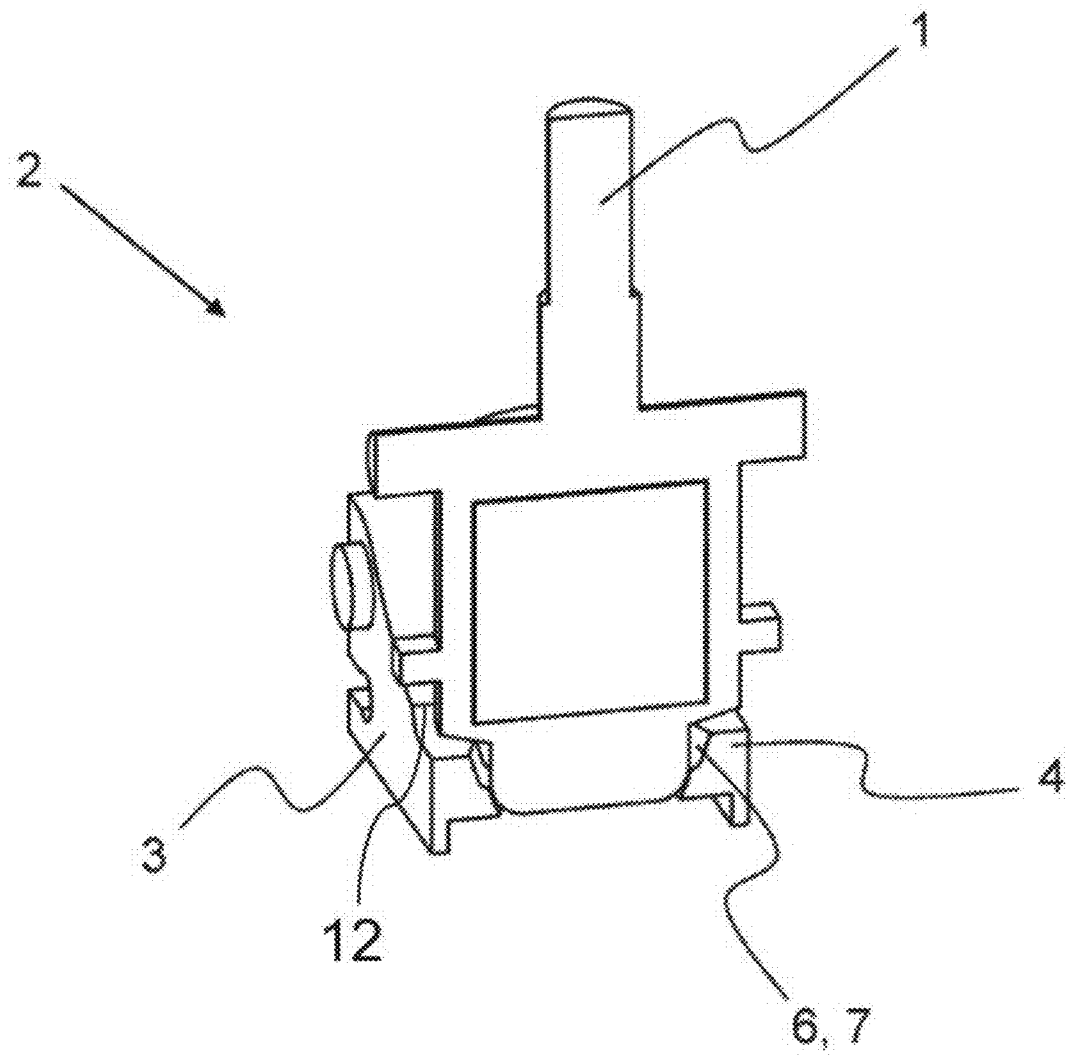
FIG. 3: a schematic sectional view of an operating lever according to the invention comprising link system in a preferred embodiment, wherein the operating lever is located in a pushed-in position.

FIG. 3 shows a schematic sectional view of an operating lever 1 according to the invention comprising link system 2 in a preferred embodiment, as illustrated in the previous figures, wherein the operating lever 1 is located in a pushed-in position. Here, the design of the link 7, which is formed by means of the recesses 6 of the link parts 3, 4, is visible in the region of the zero position, the width of which decreases in the direction of the operating lever radially to the pivoting movement with increasing distance from said operating lever, so that a pushing in of the operating lever 1 in the direction radially to the pivoting movement results in the link parts 3, 4 being pushed apart.

What is not illustrated is an embodiment according to the invention, in the case of which only one link part 3 is provided, on which the restoring means 5 act, which support themselves on the housing 11 in this case. This simplest embodiment according to the invention is constructed narrower than the above-described embodiment and can thus be advantageous. On the other hand, it lacks the self-centering and similar movability of the above-describe embodiment.

In a preferred embodiment as two link parts, which are movable against one another and which are in particular guided along one another and which are moved apart from one another by means of a movement of the operating lever against a force, the design of the link according to the invention provides for a force curve, which changes with increasing deflection of the operating lever.

The invention claimed is:

1. A link system comprising an operating lever, wherein the link system has at least a first link part and restoring means, which act on the at least one link part and transfer the latter into a zero position, and wherein the operating lever is guided in the link system, the first link part is movably mounted in such a way that a positional change of the operating level results in a movement of the at least one link part in the direction of the restoring means acting on the at least one link part, wherein the link system has the first link part and a second link part, which are movably mounted in such a way that a positional change of the operating lever results in the two link parts being moved apart perpendicular to a pivoting plane, wherein the link parts have recesses, in which the operating lever is guided, wherein the width of the link in the region of the zero position of the operating lever in the direction of the operating lever radially to pivoting movement of the operating lever is designed so as to decrease with increasing distance therefrom, and wherein a pushing of the operating lever in the direction radially to the pivoting movement results in the two link parts being moved apart in the direction radially to the pivoting movement.

2. The operating lever comprising the link system according to claim 1, wherein the link system has exactly two link parts.

3. The link system according to claim 1, wherein the link parts have recesses, in which the operating lever is guided.

4. The link system according to claim 3, wherein the width of the link in the region of the zero position of the operating lever in the direction of the operating lever radially to pivoting movement of the operating lever is designed so as to decrease with increasing distance therefrom.

5. The link system according to claim 4, wherein a pushing of the operating lever in the direction radially to the pivoting movement results in the two link parts being moved apart in the direction radially to the pivoting movement.

6. The link system according to claim 1, wherein the width of the link is designed to decrease in the pivoting direction of the operating lever with increasing distance from the zero position thereof.

7. The link system according to claim 1, wherein the link has detent points and/or positive pressure points.

8. The link system according to claim 1, wherein a positional change of the operating lever to the link system results in the two link parts being moved apart relative to one another perpendicular to the pivoting plane of the operating lever.

9. The link system according to claim 1, wherein the operating lever has first and optionally second guide means, which limit the movement of the link parts to only one common axis.

10. The link system according to claim 9, wherein the first guide means are formed as protrusions.

11. The link system according to claim 10, wherein the protrusions are in elongated, cylindrical form, wherein the second guide means are formed as hollow spaces which correspond to the protrusions.

12. The link system of claim 9, wherein the first guide means are arranged on at least one of the link parts, and second guide means are arranged on the respective other link part correspondingly thereto.

13. The link system according to claim 1, wherein the link parts are movably mounted on one another.

14. The link system according to claim 1, wherein the restoring means are formed as elastic means.

15. The link system according to claim 14, wherein the elastic means include springs.

* * * * *